(12) United States Patent
Sakagami et al.

(10) Patent No.: US 8,084,563 B2
(45) Date of Patent: Dec. 27, 2011

(54) CYCLIC OLEFIN ADDITION COPOLYMER, PROCESS FOR PRODUCTION THEREOF, AND RETARDATION FILM OBTAINED FROM THE COPOLYMER

(75) Inventors: Toshinori Sakagami, Chuo-ku (JP); Takashi Imamura, Chuo-ku (JP); Takashi Tsubouchi, Chuo-ku (JP)

(73) Assignee: JSR Corporation, Tokyo (JP)

( * ) Notice: Subject to any disclaimer, the term of this patent is extended or adjusted under 35 U.S.C. 154(b) by 290 days.

(21) Appl. No.: 12/307,796

(22) PCT Filed: Jul. 4, 2007

(86) PCT No.: PCT/JP2007/063355
§ 371 (c)(1),
(2), (4) Date: May 6, 2009

(87) PCT Pub. No.: WO2008/004573
PCT Pub. Date: Jan. 10, 2008

(65) Prior Publication Data
US 2010/0021707 A1    Jan. 28, 2010

(30) Foreign Application Priority Data

Jul. 7, 2006 (JP) .................................. 2006-188051
Dec. 21, 2006 (JP) .................................. 2006-344672

(51) Int. Cl.
C08F 232/08 (2006.01)
C08F 232/04 (2006.01)
C08F 4/70 (2006.01)
G02F 1/1335 (2006.01)

(52) U.S. Cl. ........ 526/281; 526/134; 526/145; 526/172; 349/117

(58) Field of Classification Search .................. 526/145, 526/172, 281, 134; 349/117
See application file for complete search history.

(56) References Cited

U.S. PATENT DOCUMENTS

| | | | |
|---|---|---|---|
| 2,883,372 A | 4/1959 | Stamatoff | |
| 5,061,771 A | 10/1991 | Oshima et al. | |
| 5,164,469 A | 11/1992 | Goto et al. | |
| 5,191,026 A | 3/1993 | Nishi et al. | |
| 5,468,819 A | 11/1995 | Goodall et al. | |
| 5,912,504 A | 6/1999 | Yoshizawa et al. | |
| 6,455,650 B1 * | 9/2002 | Lipian et al. | 526/171 |
| 6,723,486 B2 * | 4/2004 | Goodall et al. | 430/270.1 |
| 7,268,196 B2 | 9/2007 | Oshima et al. | |
| 2007/0155922 A1 | 7/2007 | Ebata et al. | |

FOREIGN PATENT DOCUMENTS

| | | |
|---|---|---|
| EP | 0 303 246 A2 | 2/1989 |
| EP | 1 364 975 A1 | 11/2003 |
| EP | 1 712 572 A1 | 10/2006 |
| JP | 50-111200 | 9/1975 |
| JP | 61-292601 | 12/1986 |
| JP | 63-21878 | 1/1988 |
| JP | 1-132626 | 5/1989 |
| JP | 1-138257 | 5/1989 |
| JP | 1-168725 | 7/1989 |
| JP | 2-102221 | 4/1990 |
| JP | 2-133413 | 5/1990 |
| JP | 4-170425 | 6/1992 |
| JP | 8-198919 | 8/1996 |
| JP | 9-508649 | 9/1997 |
| JP | 2002-327024 | 11/2002 |
| JP | 2004-037543 | 2/2004 |
| JP | 2005-48060 | 2/2005 |
| JP | 2005-162990 | 6/2005 |
| JP | 2005-213435 | 8/2005 |
| JP | 2006-52347 | 2/2006 |
| WO | WO 95/14048 | 5/1995 |
| WO | 00 20472 | 4/2000 |
| WO | WO 2004/007587 A1 | 1/2004 |

OTHER PUBLICATIONS

W. Kaminsky, et al., "New Polymers by Homogenous Zirconocene/Aluminoxane Catalysts", Makromol. Chem., Makromol Symp., vol. 47, 1991, pp. 83-93.

Brian L. Goodall, et al., "Novel Heat Resistant Cyclic Olefin Polymers Made Using Single Component Nickel and Palladium Catalysts" Pro. Am. Chem. Soc. Div. Polym. Mater: Sci. Eng., pp. 56-57, (1997).

John Lipian, et al., "Addition Polymerization of Norbornene-Type Monomers. High Activity Cationic Allyl Palladium Catalysts", Macromolecules, vol. 35, No. 24, XP-002983779, Oct. 26, 2002, pp. 8969-8977.

Office Action issued Nov. 1, 2011, in Japan Patent Application No. 2006-344672.

* cited by examiner

*Primary Examiner* — Fred M Teskin
(74) *Attorney, Agent, or Firm* — Oblon, Spivak, McClelland, Maier & Neustadt, L.L.P.

(57) ABSTRACT

A cyclic olefin addition copolymer includes a structural unit (1) derived from a cyclic olefin compound with a C4 alkyl substituent group and a structural unit (2) derived from a cyclic olefin compound with a C5-12 alkyl substituent group, and optionally includes a structural unit (3) derived from another cyclic olefin compound. The novel cyclic olefin addition copolymers according to the present invention are excellent in melt-formability, transparency and heat resistance, have low water absorption properties, low dielectric constant and low metal content, and are suitably used in optical parts such as optical films. Processes according to the present invention produce the cyclic olefin addition copolymers at high yield with small amounts of catalysts.

20 Claims, No Drawings

CYCLIC OLEFIN ADDITION COPOLYMER, PROCESS FOR PRODUCTION THEREOF, AND RETARDATION FILM OBTAINED FROM THE COPOLYMER

CROSS-REFERENCE TO RELATED APPLICATIONS

This application is a national stage application under 35 U.S.C. 371 of PCT application Serial No. JP 2007/063355 filed Jul. 4, 2007 which is a continuation of Japanese priority applications JP 2006-188051 filed on Jul. 7, 2006 and JP 2006-344672 filed on Dec. 21, 2006.

TECHNICAL FIELD

The present invention relates to cyclic olefin addition copolymers, processes for the production thereof, and retardation films obtained from the copolymers. In detail, the invention relates to cyclic olefin addition copolymers which include a structural unit derived from a cyclic olefin monomer with a C4 alkyl substituent group and a structural unit derived from a cyclic olefin monomer with a C5-12 alkyl substituent group and which show excellent properties such as transparency, heat resistance, melt processability, low water absorption and low dielectric constant and are useful in optical applications such as optical films. The invention also relates to high productivity processes for producing the addition copolymers, and optical films and retardation films obtained from the copolymers.

BACKGROUND OF THE INVENTION

Optical materials for lenses, backlights, light guide plates and optical films are naturally required to have high transparency, but there are increasing demands for heat resistance, low water absorption, low dielectric constant, flexibility and toughness.

Known transparent resins used in optical materials are for example polyester resins, acrylic resins, polycarbonate resins, polyacrylate resins and polyethersulfone resins. These resins, however, have insufficient heat resistance, water absorption properties and transparency.

A great number of hydrogenated ring-opened polymers or addition polymers of cyclic olefin compounds are developed as resins having excellent transparency and heat resistance. Because the main chains of these resins are formed of alicyclic hydrocarbons, they have lower absorption in a low wavelength region than aromatic resins.

Many kinds of ring-opened cyclic olefin polymers and hydrogenated products thereof are reported as useful optical materials for the production of lenses or optical disks (for example, Patent Documents 1, 2, 3, 4, 5 and 6). The ring-opened cyclic olefin (co)polymers and hydrogenated products thereof disclosed in these documents have excellent heat resistance, low water (moisture) absorption, good optical properties such as transparency, and high forming properties such as injection moldability.

Further, ring-opened polymers from cyclic olefin monomers having a polar group in the molecule, and hydrogenated products thereof are disclosed (for example, Patent Documents 7 and 8). They have superior heat resistance, optical properties, forming properties and affinity for other materials, and are excellent in post workability such as bonding. However, ring-opened cyclic olefin polymers have a double bond in the polymer main chain and entail hydrogenation to improve heat degradation resistance. As a result, industrial productivity and costs are deteriorated.

It is known that addition polymerization of cyclic olefin compounds gives resins having excellent heat resistance and transparency. Because the polymer main chain has no double bonds, the polymers have high heat degradation resistance and do not entail hydrogenation, and good industrial productivity and cost advantages are obtained. A number of cyclic olefin addition polymers are reported. For example, Patent Documents 9 and 10 disclose addition copolymers of cyclic olefin compounds and α-olefins. In these copolymers, however, a series of structural units derived from α-olefin such as ethylene is sometimes crystallized and the transparency is lowered. Such materials are often not suited for use as optical materials. Further, cyclic olefins and α-olefins greatly differ from each other in polymerization reactivity and consequently the copolymers often have a nonuniform composition and lower transparency.

On the other hand, cyclic olefin addition polymers consisting solely of structural units derived from cyclic olefin compounds are produced with titanium catalysts, zirconium catalysts, cobalt catalysts, nickel catalysts and palladium catalysts, and they show very high heat resistance and transparency as known in the art. It is known that the selection of catalyst determines the polymer's stereoregularity (atactic, erythro-di-syndiotactic, erythro-di-isotactic), addition polymerization mode (addition at 2 and 3 positions, addition at 2 and 7 positions), and molecular weight controllability. For example, norbornene polymers produced with a zirconium metallocene catalyst are non-soluble and do not dissolve in general solvents (Non-Patent Document 1). Norbornene addition polymers produced with a nickel catalyst show good solubility in hydrocarbon solvents such as cyclohexane (Patent Document 11) but are poor in mechanical strength and are brittle (Patent Document 12).

Patent Documents 12, 13 and 14 report that a specific catalyst containing a palladium compound shows high polymerization activity and provides cyclic olefin addition polymers having excellent transparency, heat resistance and mechanical strength. Further, Patent Document 15 teaches that addition copolymerization of a hydrolyzable silyl group-containing cyclic olefin with a catalyst containing a palladium compound affords a cyclic olefin copolymer showing excellent heat resistance and dimension stability. The addition polymers described in these documents have very high heat resistance; however, they cannot be shaped by thermal fusion and forming methods are limited to solution casting methods. The casting methods involve large amounts of solvents, and entail solvent removal and collection and also entail larger facility therefor, thereby lowering productivity and increasing costs.

To lower the glass transition temperature of the cyclic olefin addition polymers and thereby render the polymers melt-formable, it is proposed that alkyl-substituted cyclic olefin compounds may be used as monomers. For example, Patent Document 16 describes addition copolymers having 5-hexyl-2-norbornene. Patent Document 11 and Non-Patent Document 2 describe that a norbornene having a long-chain alkyl group is used as a monomer and the glass transition temperature of an addition copolymer is controlled by changing the chain length and proportion of the norbornene monomers. However, these documents do not describe effects of polymerization catalysts on mechanical strength of obtainable shaped articles. Further, the polymerization catalysts used in the above documents are still insufficient in activity, and post treatments for removing residual unreacted monomers and catalysts are required.

Furthermore, a cyclic olefin having a long-chain alkyl group shows lower polymerization reactivity than norbornene, and copolymerization of these compounds results in a copolymer having a nonuniform composition. Patent Documents 16 and 11 and Non-Patent Document 2 are silent on different reactivity of monomers and composition distribution. The composition distribution becomes more nonuniform as the conversion increases, and the obtainable shaped articles tend to have lower transparency and strength. Accordingly, achieving both high conversion and high transparency is desired. That is, it is desired that economic and productive processes are developed to produce cyclic olefin copolymers having good heat resistance and melt-formability as well as high transparency at high conversion. However, there have been no reports of such production processes.

Patent Document 1: JP-A-S63-21878
Patent Document 2: JP-A-H1-138257
Patent Document 3: JP-A-H1-168725
Patent Document 4: JP-A-H2-102221
Patent Document 5: JP-A-H2-133413
Patent Document 6: JP-A-H4-170425
Patent Document 7: JP-A-S50-111200
Patent Document 8: JP-A-H1-132626
Patent Document 9: JP-A-S61-292601
Patent Document 10: U.S. Pat. No. 2,883,372
Patent Document 11: JP-B-H9-508649
Patent Document 12: JP-A-2006-52347
Patent Document 13: JP-A-2005-162990
Patent Document 14: JP-A-2005-213435
Patent Document 15: JP-A-2005-48060
Patent Document 16: JP-A-H8-198919
Non-Patent Document 1: Makromol. Chem. Macromol. Symp., Vol. 47, 831 (1991)
Non-Patent Document 2: Proc. Am. Chem. Soc. Div. Polym. Mater.: Sci. Eng. Vol. 75, 56 (1997)

DISCLOSURE OF THE INVENTION

It is an object of the present invention to provide novel cyclic olefin addition copolymers that are excellent in melt-formability and properties such as transparency, heat resistance, low water absorption and low dielectric constant and are useful in optical applications such as optical films. It is another object of the invention to provide processes for producing the addition copolymers with high productivity, and retardation films obtained by stretching films containing the addition copolymer as a main component.

A cyclic olefin addition copolymer according to the present invention comprises a structural unit (1) represented by Formula (1) below and a structural unit (2) represented by Formula (2) below:

[Chem. 1]

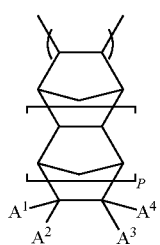

(1)

wherein one of $A^1$, $A^2$, $A^3$ and $A^4$ is a C4 alkyl group and the other groups are each independently a hydrogen atom, a halogen atom or a methyl group, and p is an integer of 0 to 5;

[Chem. 2]

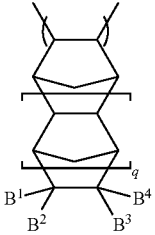

(2)

wherein one of $B^1$, $B^2$, $B^3$ and $B^4$ is a C5-12 alkyl group and the other groups are each independently a hydrogen atom, a halogen atom or a methyl group, and q is an integer of 0 to 5.

In the cyclic olefin addition copolymer, the molar ratio of the structural unit (1) to the structural unit (2) (structural unit (1)/structural unit (2)) is preferably 10/90 to 90/10, and the structural units (1) and (2) combined preferably account for 80 to 100 mol % of all the structural units.

Preferably, the cyclic olefin addition copolymer further comprises a structural unit (3) represented by Formula (3) below at not more than 20 mol % relative to all the structural units:

[Chem. 3]

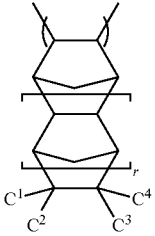

(3)

wherein $C^1$, $C^2$, $C^3$ and $C^4$ are each independently an atom or a group selected from the group consisting of functional groups consisting of alkoxycarbonyl groups, alkylcarbonyloxy groups, alkenylcarbonyloxy groups, acid anhydride groups, oxetanyl groups and hydrolyzable silyl groups, a hydrogen atom, a methyl group and halogen atoms; and r is an integer of 0 to 5.

The cyclic olefin addition copolymer preferably has a glass transition temperature of 100 to 250° C. and a number average molecular weight of 20,000 to 200,000.

A process for producing a cyclic olefin addition copolymer according to the present invention comprises addition copolymerizing a monomer composition in the presence of a catalyst obtained from (a), (b) and (d) described below or a catalyst obtained from (c) and (d) described below, the monomer composition comprising a monomer (1m) represented by Formula (1m) below, a monomer (2m) represented by Formula (2m) below and optionally a monomer (3m) represented by Formula (3m) below, the molar ratio of the monomer (1m) to the monomer (2m) (monomer (1m)/monomer (2m)) being in the range of 10/90 to 90/10, the monomers (1m) and (2m) combined accounting for not less than 80 mol % of all the structural units:

[Chem. 4]

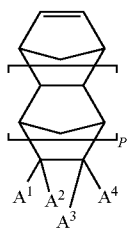

(1m)

wherein one of $A^1$, $A^2$, $A^3$ and $A^4$ is a C4 alkyl group and the other groups are each independently a hydrogen atom, a halogen atom or a methyl group, and p is an integer of 0 to 5;

[Chem. 5]

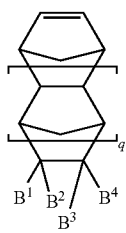

(2m)

wherein one of $B^1$, $B^2$, $B^3$ and $B^4$ is a C5-12 alkyl group and the other groups are each independently a hydrogen atom, a halogen atom or a methyl group, and q is an integer of 0 to 5;

[Chem. 6]

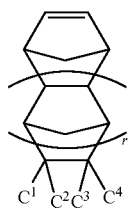

(3m)

wherein $C^1$, $C^2$, $C^3$ and $C^4$ are each independently an atom or a group selected from the group consisting of functional groups consisting of alkoxycarbonyl groups, alkylcarbonyloxy groups, alkenylcarbonyloxy groups, acid anhydride groups, oxetanyl groups and hydrolyzable silyl groups, a hydrogen atom, a methyl group and halogen atoms; and r is an integer of 0 to 5;

(a) a palladium organic acid salt or a palladium β-diketonate compound;

(b) a phosphine compound represented by Formula (b) below:

$$P(R^1)_2(R^2) \tag{b}$$

wherein $R^1$ is a substituent group selected from the group consisting of a cyclopentyl group, a cyclohexyl group and an isopropyl group, and $R^2$ is a C3-10 hydrocarbon group;

(c) a divalent palladium phosphine complex represented by Formula (c) below:

$$Pd[P(R^1)_2(R^2)]_nX_2 \tag{c}$$

wherein $R^1$ is a substituent group selected from the group consisting of a cyclopentyl group, a cyclohexyl group and an isopropyl group, $R^2$ is a C3-10 hydrocarbon group, X is an organic acid anion or a β-diketonate anion, and n is 1 or 2;

(d) an ionic boron compound.

An optical film according to the present invention comprises the cyclic olefin addition copolymer.

An optical film according to the present invention is obtained by melt extruding the cyclic olefin addition copolymer.

A retardation film according to the present invention is obtained by stretching a film comprising the cyclic olefin addition copolymer.

In the retardation film, the molar ratio of the structural unit (1) to the structural unit (2) (structural unit (1)/structural unit (2)) is preferably 10/90 to 90/10, and the structural units (1) and (2) combined preferably account for 80 to 100 mol % of all the structural units.

Preferably, the retardation film contains a structural unit (3) represented by Formula (3) below at not more than 20 mol % relative to all the structural units:

[Chem. 7]

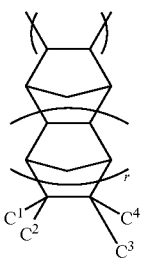

(3)

wherein $C^1$, $C^2$, $C^3$ and $C^4$ are each independently an atom or a group selected from the group consisting of functional groups consisting of alkoxycarbonyl groups, alkylcarbonyloxy groups, alkenylcarbonyloxy groups, acid anhydride groups, oxetanyl groups and hydrolyzable silyl groups, a hydrogen atom, a methyl group and halogen atoms; and r is an integer of 0 to 5.

In the retardation film, the stretching temperature is preferably in the range of from Tg to (Tg−70)° C. (wherein Tg is a glass transition temperature of the cyclic olefin addition copolymer) and the draw ratio is preferably 1.1 to 3.0 times.

In the retardation film, the retardance (Re), thickness, and draw ratio preferably satisfy the following equation:

[(Re (nm)/thickness (nm))/draw ratio]>0.001

In a preferred embodiment of the retardation film, the film obtained by stretching the cyclic olefin addition copolymer preferably has a thickness of 0.1 to 150 μm.

In the retardation film, the cyclic olefin addition copolymer preferably has a glass transition temperature (Tg) of 120 to 250° C. and a number average molecular weight of 20,000 to 200,000.

ADVANTAGES OF THE INVENTION

The novel cyclic olefin addition copolymers according to the present invention are excellent in melt-formability, transparency and heat resistance, have low water absorption properties, low dielectric constant and low metal content, and are suitably used in optical parts such as optical films. The processes according to the present invention produce the novel cyclic olefin addition copolymers at high yield with small amounts of catalysts.

The optical films from the novel cyclic olefin addition copolymers according to the present invention are excellent in transparency and heat resistance, have low water absorption properties, low dielectric constant and low metal content, and possess high flexibility and toughness.

The retardation films of the invention are not thermally degraded, have excellent transparency and heat resistance, low water absorption properties, low dielectric constant and low metal content, and possess high flexibility and toughness. The in-plane retardance of the film is highly uniform and retardation properties are insusceptible to environmental temperature or humidity and are stable over time. Further, the films show excellent retardance expression properties.

PREFERRED EMBODIMENTS OF THE INVENTION

The present invention will be described in detail hereinbelow.

Processes for Producing Cyclic Olefin Addition Copolymers

A cyclic olefin addition copolymer according to the present invention includes a structural unit (1) of Formula (1) below which has a C4 alkyl substituent group, a structural unit (2) of Formula (2) below which has a C5-12 alkyl substituent group, and optionally a structural unit (3) of Formula (3) below.

[Chem. 8]

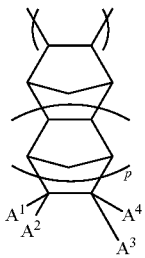

(1)

In Formula (1), one of $A^1$, $A^2$, $A^3$ and $A^4$ is a C4 alkyl group and the other groups are each independently a hydrogen atom, a halogen atom or a methyl group, and p is an integer of 0 to 5.

[Chem. 9]

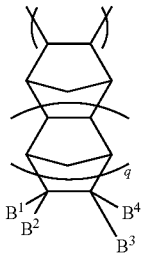

(2)

In Formula (2), one of $B^1$, $B^2$, $B^3$ and $B^4$ is a C5-12 alkyl group and the other groups are each independently a hydrogen atom, a halogen atom or a methyl group, and q is an integer of 0 to 5.

[Chem. 10]

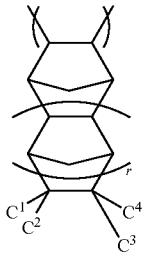

(3)

In Formula (3), $C^1$, $C^2$, $C^3$ and $C^4$ are each independently an atom or a group selected from the group consisting of functional groups consisting of alkoxycarbonyl groups, alkylcarbonyloxy groups, alkenylcarbonyloxy groups, acid anhydride groups, oxetanyl groups and hydrolyzable silyl groups, a hydrogen atom, a methyl group and halogen atoms; and r is an integer of 0 to 5.

Here, the structural units (1), (2) and (3) are generally derived from a monomer (1m) of Formula (1m) below, a monomer (2m) of Formula (2m) below and a monomer (3m) of Formula (3m) below, respectively.

[Chem. 11]

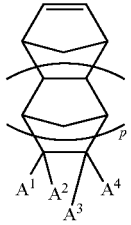

(1m)

In Formula (1m), $A^1$, $A^2$, $A^3$, $A^4$ and p are as defined in Formula (1).

[Chem. 12]

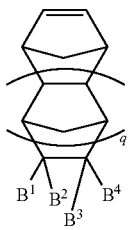

(2m)

In Formula (2m), $B^1$, $B^2$, $B^3$, $B^4$ and q are as defined in Formula (2).

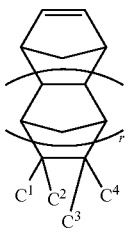

(3m)

In Formula (3m), $C^1$, $C^2$, $C^3$, $C^4$ and r are as defined in Formula (3).

<Monomer Composition>

The cyclic olefin addition copolymer may be obtained by copolymerizing a monomer composition that includes the monomer (1m), the monomer (2m) and optionally the monomer (3m).

Preferred alkyl substituent groups in the structural unit (1) and the monomer (1m) include 1-butyl group. Preferred alkyl substituent groups in the structural unit (2) and the monomer (2m) include substituent groups having linear or branched alkyl groups such as 1-pentyl group, 1-hexyl group, 1-heptyl group, 1-octyl group, 1-nonyl group, 1-decyl group, 1-undecyl group, 1-dodecyl group, 2-decyl group and 8-methyl-1-nonyl group, with 1-decyl group and 1-dodecyl group being preferable.

Examples of the monomers (1m) include 5-butylbicyclo[2.2.1]hepta-2-ene and 8-butyl-tetracyclo[4.4.0.1$^{2,5}$.1$^{7,10}$]dodeca-3-ene. Of the monomers (1m), 5-butylbicyclo[2.2.1]hepta-2-ene of Formula (1m) in which p is 0 is more preferable.

Examples of the monomers (2m) include those having a linear alkyl group such as 5-pentylbicyclo[2.2.1]hepta-2-ene, 5-hexylbicyclo[2.2.1]hepta-2-ene, 5-heptylbicyclo[2.2.1]hepta-2-ene, 5-octylbicyclo[2.2.1]hepta-2-ene, 5-nonylbicyclo[2.2.1]hepta-2-ene, 5-decylbicyclo[2.2.1]hepta-2-ene, 5-undecylbicyclo[2.2.1]hepta-2-ene, 5-dodecylbicyclo[2.2.1]hepta-2-ene, 8-pentyltetracyclo[4.4.0.1$^{2,5}$.1$^{7,10}$]dodeca-3-ene, 8-hexyltetracyclo[4.4.0.1$^{2,5}$.1$^{7,10}$]dodeca-3-ene, 8-heptyltetracyclo[4.4.0.1$^{2,5}$.1$^{7,10}$]dodeca-3-ene, 8-octyltetracyclo[4.4.0.1$^{2,5}$.1$^{7,10}$]dodeca-3-ene, 8-nonyltetracyclo[4.4.0.1$^{2,5}$.1$^{7,10}$]dodeca-3-ene, 8-decyltetracyclo[4.4.0.1$^{2,5}$.1$^{7,10}$]dodeca-3-ene, 8-undecyltetracyclo[4.4.0.1$^{2,5}$.1$^{7,10}$]dodeca-3-ene and 8-dodecyltetracyclo[4.4.0.1$^{2,5}$.1$^{7,10}$]dodeca-3-ene; and those having a branched alkyl group such as 2-(bicyclo[2.2.1]hepta-2-ene-5-yl)decene and 8-methyl-1-(bicyclo[2.2.1]hepta-2-ene-5-yl)nonane. Of the monomers (2m), 5-alkylbicyclo[2.2.1]hepta-2-enes of Formula (2m) in which q is 0 and the alkyl group has 5 to 12 carbon atoms are more preferable. In particular, 5-decylbicyclo[2.2.1]hepta-2-ene and 5-dodecylbicyclo[2.2.1]hepta-2-ene are preferable because materials are industrially obtained easily. The use of the monomers (2m) wherein the alkyl group has 5 or more carbon atoms provides excellent melt-formability, and the obtainable copolymer may be shaped at moderately high temperatures. Accordingly, degradation or coloration of shaped articles caused by high temperatures in the shaping may be prevented. If the alkyl group has more than 12 carbon atoms, the boiling point of the 5-alkylbicyclo[2.2.1]hepta-2-ene is so increased that purification in the industrial production is difficult.

In the monomers (3m), at least one of $C^1$ to $C^4$ in Formula (3m) may be a functional group selected from the group consisting of alkoxycarbonyl groups, alkylcarbonyloxy groups, acid anhydride groups, alkenylcarbonyloxy groups, oxetanyl groups and hydrolyzable silyl groups. Alternatively, $C^1$ to $C^4$ may be each an atom or a group selected from a hydrogen atom, a methyl group and halogen atoms. When the monomer (3m) has the above functional group, a crosslinking group may be easily introduced into an addition copolymer obtained from the monomer composition containing such monomer (3m) and the addition copolymer gives adhesive shaped articles. Accordingly, it is a preferred embodiment that in the monomer (3m) represented by Formula (3m), at least one of $C^1$ to $C^4$ is a functional group selected from the group consisting of alkoxycarbonyl groups, alkylcarbonyloxy groups, alkenylcarbonyloxy groups, acid anhydride groups, oxetanyl groups and hydrolyzable silyl groups, in order to facilitate the introduction of crosslinking groups or to produce adhesive shaped articles.

Specific examples of the monomers (3m) having functional groups include bicyclo[2.2.1]hepta-5-ene-2-methyl carboxylate, 2-methylbicyclo[2.2.1]hepta-5-ene-2-methyl carboxylate, 2-methylbicyclo[2.2.1]hepta-5-ene-2-t-butyl carboxylate, tetracyclo[6.2.1.1$^{3,6}$.0$^{2,7}$]dodeca-9-ene-4-methyl carboxylate, 4-methyltetracyclo[6.2.1.1$^{3,6}$.0$^{2,7}$]dodeca-9-ene-4-methyl carboxylate, 4-methyltetracyclo[6.2.1.1$^{3,6}$.0$^{2,7}$]dodeca-9-ene-4-t-butyl carboxylate, (bicyclo[2.2.1]hepta-5-ene-2-yl)acetate, (bicyclo[2.2.1]hepta-5-ene-2-methyl-2-yl)acetate, (tetracyclo[6.2.1.1$^{3,6}$.0$^{2,7}$]dodeca-9-ene-4-yl)acetate, bicyclo[2.2.1]hepta-5-ene-2,3-carboxylic anhydride, 5-[(3-ethyl-3-oxetanyl)methoxy]bicyclo[2.2.1]hepta-2-ene, 5-[(3-oxetanyl)methoxy]bicyclo[2.2.1]hepta-2-ene, bicyclo[2.2.1]hepta-5-ene-2-(3-ethyl-3-oxetanyl)methyl carboxylate, 5-trimethoxysilylbicyclo[2.2.1]hepta-2-ene and 5-triethoxysilylbicyclo[2.2.1]hepta-2-ene.

Of the monomers (3m), those in which r in Formula (3m) is 0 are more preferable.

The monomer composition in the invention essentially contains the monomers (1m) and (2m) and may contain the monomer (3m) as required. The flexibility of shaped articles such as films and sheets from the copolymer tends to increase and the glass transition temperature tends to be lowered with increasing proportion of the monomer (2m). Increasing the proportion of the monomer (3m) tends to increase the elastic modulus of shaped articles such as films and sheets from the copolymer but also tends to reduce flexibility (elongation). An excessively high proportion of the monomer (3m) having the functional group can reduce polymerization activity and deteriorate productivity.

In the monomer composition, the molar ratio of the monomer (1m) to the monomer (2m) (monomer (1m)/monomer (2m)) is desirably 10/90 to 90/10, preferably 20/80 to 90/20, and more preferably 40/60 to 90/10. If the monomer (1m) accounts for less than 10 mol % of the total of the monomers (1m) and (2m), the obtainable addition copolymer may have an excessively low glass transition temperature and heat resistance may be insufficient. If the monomer (1m) accounts for more than 90 mol % of the total of the monomers (1m) and (2m), the glass transition temperature may be excessively increased and forming properties may be deteriorated.

In the monomer composition, the monomers (1m) and (2m) combined preferably account for 80 to 100mol % of all the monomers. If the monomer composition contains more than 20 mol % of a monomer other than the monomers (1m) and (2m), the obtainable copolymer may have bad forming properties or shaped articles from the copolymer may have lower strength. Accordingly, it is desirable that when the monomer composition contains the monomer (3m), the proportion of the monomer (3m) is not more than 20 mol % in the monomer composition.

The monomer composition in the invention is not particularly limited but is preferably composed of the monomers (1m) and (2m) and optionally the monomer (3m) without any other monomers. The monomers (1m), monomers (2m) or monomers (3m) may be used singly, or two or more kinds may be used in combination.

<Polymerization Catalysts>

In the processes for producing cyclic olefin addition copolymers according to the invention, the above-described monomer composition is subjected to addition copolymerization in the presence of a catalyst obtained from (a), (b) and (d) below or a catalyst obtained from (c) and (d) below:

(a) a palladium organic acid salt or a palladium β-diketonate compound;

(b) a phosphine compound represented by Formula (b) below:

$$P(R^1)_2(R^2) \quad (b)$$

wherein $R^1$ is a substituent group selected from the group consisting of a cyclopentyl group, a cyclohexyl group and an isopropyl group, and $R^2$ is a C3-10 hydrocarbon group;

(c) a divalent palladium phosphine complex represented by Formula (c) below:

$$Pd[P(R^1)_2(R^2)]_nX_2 \quad (c)$$

wherein $R^1$ is a substituent group selected from the group consisting of a cyclopentyl group, a cyclohexyl group and an isopropyl group, $R^2$ is a C3-10 hydrocarbon group, X is an organic acid anion or a β-diketonate anion, and n is 1 or 2;

(d) an ionic boron compound.

By using the palladium catalysts containing the above catalyst components, shaped articles of excellent mechanical strength can be obtained. Further, because the catalyst shows very high polymerization activity, only a minute amount of the palladium compound provides a high conversion exceeding 95% in the copolymerization, and the amounts of the residual monomers or metal components in the obtainable addition copolymer can be drastically reduced.

Hereinbelow, the catalyst components will be described.

The palladium organic acid salts and palladium β-diketonate compounds include carboxylates, sulfonates and β-diketonate compounds of divalent palladium. Preferred examples include:

(1) C1-15 organic monocarboxylates such as palladium acetate, palladium chloroacetate, palladium fluoroacetate, palladium trifluoroacetate, palladium propionate, palladium 3,3,3-trifluoropropionate, palladium butyrate, palladium 3-methylbutyrate, palladium pentanoate, palladium hexanoate, palladium 2-ethylhexanoate, palladium octanoate, palladium dodecanoate, palladium 2-methylpropenoate, palladium octadeca-9-enoate, palladium cyclohexanecarboxylate, palladium benzoate, palladium 2-methylbenzoate, palladium 4-methylbenzoate and palladium naphthalenecarboxylate;

(2) C1-20 organic sulfonates such as palladium methanesulfonate, palladium trifluoromethanesulfonate, palladium p-toluenesulfonate, palladium benzenesulfonate, palladium naphthalenesulfonate and palladium dodecylbenzenesulfonate; and (3) C5-15 β-diketonate compounds such as 2,4-pentandione (acetylacetonate), methyl acetoacetate, ethyl acetoacetate and hexafluoroacetylacetone of palladium. Of these, palladium acetate, palladium propionate, palladium 2-ethylhexanoate and palladium bis(acetylacetonate) are preferable, and palladium acetate is most preferable.

Preferred examples of the phosphine compounds (b) represented by Formula (b) include tricyclopentylphosphine, dicyclopentyl(cyclohexyl)phosphine, dicyclopentyl(3-methylcyclohexyl)phosphine, dicyclopentyl(isopropyl)phosphine, dicyclopentyl(s-butyl)phosphine, dicyclopentyl(t-butyl)phosphine, dicyclopentyl(2-methylphenyl)phosphine, tricyclohexylphosphine, dicyclohexyl(cyclopentyl)phosphine, dicyclohexyl(3-methylcyclohexyl)phosphine, dicyclohexyl(isopropyl)phosphine, dicyclohexyl(2-methylphenyl)phosphine and triisopropylphosphine. Of these, tricyclopentylphosphine and tricyclohexylphosphine are preferable.

The divalent palladium phosphine complexes (c) represented by Formula (c) show higher solubility in hydrocarbon solvents than the palladium compounds (a) and are therefore advantageous in solution polymerization processes. They are also advantageous in having high efficiency of active species generation and substantially no induction period.

Examples of the palladium phosphine complexes of Formula (c) include but are not limited to (tricyclopentylphosphine)palladium diacetate, [bis(tricyclopentylphosphine)] palladium diacetate, [dicyclopentyl(t-butyl)phosphine] palladium diacetate, [dicyclopentyl(cyclohexyl)phosphine] palladium diacetate, [dicyclopentyl(2-methylphenyl) phosphine]palladium diacetate, (tricyclopentylphosphine) palladium bis(trifluoroacetate), bis(tricyclopentylphosphine) palladium bis(trifluoroacetate), [dicyclopentyl(cyclohexyl) phosphine]palladium bis(trifluoroacetate), (tricyclopentylphosphine)palladium di(propionate), bis(tricyclopentylphosphine)palladium di(propionate), (tricyclopentylphosphine)palladium bis(2-ethylhexanoate), bis(tricyclopentylphosphine)palladium bis(2-ethylhexanoate), (tricyclopentylphosphine)palladium bis(acetylacetonate), bis(tricyclopentylphosphine)palladium bis(acetylacetonate), [dicyclopentyl(cyclohexyl)phosphine]palladium bis(acetylacetonate), (tricyclopentylphosphine)palladium bis(trifluoromethanesulfonate), bis(tricyclopentylphosphine)palladium bis(trifluoromethanesulfonate), (tricyclohexylphosphine)palladium diacetate, [bis(tricyclohexylphosphine)]palladium diacetate, [dicyclohexyl(t-butyl) phosphine]palladium diacetate, [dicyclohexyl(cyclopentyl) phosphine]palladium diacetate, [dicyclohexyl(2-methylphenyl)phosphine]palladium diacetate, (tricyclohexylphosphine)palladium bis(trifluoroacetate), bis(tricyclohexylphosphine)palladium bis(trifluoroacetate), [dicyclohexyl(cyclopentyl)phosphine]palladium bis(trifluoroacetate), (tricyclohexylphosphine)palladium di(propionate), bis(tricyclohexylphosphine)palladium di(propionate), (tricyclohexylphosphine)palladium bis(2-ethylhexanoate), bis(tricyclohexylphosphine)palladium bis(2-ethylhexanoate), (tricyclohexylphosphine)palladium bis(acetylacetonate), bis(tricyclohexylphosphine)palladium bis(acetylacetonate), [dicyclohexyl(cyclopentyl)phosphine]palladium bis(acetylacetonate), (tricyclohexylphosphine)palladium bis(trifluoromethanesulfonate) and bis(tricyclohexylphosphine)palladium bis(trifluoromethanesulfonate). Of these, (tricyclopentylphosphine)palladium diacetate, (tricyclopentylphosphine)palladium bis(trifluoroacetate), (tricyclopentylphosphine)palladium di(propionate), (tricyclopentylphosphine)palladium bis(2-ethylhexanoate), (tricyclopentylphosphine)palladium bis(acetylacetonate), (tricyclopentylphosphine)palladium bis(trifluoromethanesulfonate), (tricyclohexylphosphine)palladium diacetate, (tricyclohexylphosphine)palladium bis(trifluoroacetate), (tricyclohexylphosphine)palladium di(propionate), (tricyclohexylphosphine)palladium bis(2-ethylhexanoate), (tricyclohexylphosphine)palladium bis(acetylacetonate) and (tricyclohexylphosphine)palladium bis(trifluoromethanesulfonate) are preferable, and (tricyclopentylphosphine)palladium diacetate, (tricyclopentylphosphine)palladium bis(acetylacetonate), (tricyclohexylphosphine)palladium diacetate and (tricyclohexylphosphine)palladium bis(acetylacetonate) are most preferable. The phosphine complexes (c) maybe synthesized by known methods, and may be used with or without purification or separation after the synthesis. For example, they may be synthesized by reacting an appropriate palladium compound and the phosphine compound (b) in an aromatic hydrocarbon solvent or a halogenated hydrocarbon solvent at a temperature of 0 to 70° C.

Examples of the ionic boron compounds (d) include compounds represented by Formula (d) below:

$$[R^3]^+[M(R^4)_4]^- \qquad (d)$$

wherein $R^3$ is a C4-25 organic cation selected from carbenium cation, phosphonium cation, ammonium cation and anilinium cation, M is a boron atom or an aluminum atom, and $R^4$ is a fluorine-substituted or alkyl fluoride-substituted phenyl group.

Specific examples include triphenylcarbenium tetrakis(pentafluorophenyl)borate, tri(p-tolyl)carbenium tetrakis(pentafluorophenyl)borate, triphenylcarbenium tetrakis[3,5-bis(trifluoromethyl)phenyl]borate, tri(p-tolyl)carbenium tetrakis[3,5-bis(trifluoromethyl)phenyl]borate, triphenylcarbenium tetrakis(2,4,6-trifluorophenyl)borate, triphenylphosphonium tetrakis(pentafluorophenyl)borate, diphenylphosphonium tetrakis(pentafluorophenyl)borate, tributylammonium tetrakis(pentafluorophenyl)borate, N,N-dimethylanilinium tetrakis(pentafluorophenyl)borate and N,N-diethylanilinium tetrakis(pentafluorophenyl)borate. Of these, ionic boron compounds in which the cation is carbenium cation and the anion is tetrakis(pentafluorophenyl)borate anion or tetrakis(perfluoroalkylphenyl)borate anion are preferred, and triphenylcarbenium tetrakis(pentafluorophenyl)borate and triphenylcarbenium tetrakis[3,5-bis(trifluoromethyl)phenyl]borate are most preferred.

The palladium organic acid salt or palladium β-diketonate compound (a), or the divalent palladium phosphine complex (c) in a very small amount provides a high conversion to enable high economic advantages and productivity. In detail, the amount thereof per 1 mol of the monomers is 0.0005 to 0.02 mmol, preferably 0.001 to 0.01 mmol, and more preferably 0.001 to 0.005 mmol in terms of palladium atom. In addition, the amount of metal components remaining in the obtainable addition copolymer is small and therefore shaped articles having little coloration and high transparency can be obtained often without a deashing step. The phosphine compound (b) may be suitably used in an amount of 0.1 to 5 mol, and preferably 0.5 to 2 mol per 1 mol of the palladium atom in the catalyst component (a), whereby high polymerization activity may be achieved. The ionic boron compound (c) may be generally used in an amount of 0.5 to 10 mol, preferably 0.7 to 5.0 mol, and more preferably 1.0 to 2.0 mol per 1 mol of the palladium atom in the catalyst component (a). The catalyst components (a) to (d) may be prepared by any methods and may be added in any manner or order without limitation. They may be added to a mixture of the monomers and solvent simultaneously or sequentially.

<Addition Copolymerization>

In the invention, the addition copolymerization may be performed batchwise or may be carried out using an appropriate tubular continuous reactor having monomer inlets. The addition copolymerization may be carried out in a nitrogen or argon atmosphere as required or may be performed under air. The reaction temperature is in the range of 0 to 150° C., preferably 10 to 100° C., and more preferably 20 to 80° C. Solvents may be used without particular limitation. Exemplary solvents include alicyclic hydrocarbon solvents such as cyclohexane, cyclopentane and methylcyclopentane; aliphatic hydrocarbon solvents such as hexane, heptane and octane; aromatic hydrocarbon solvents such as toluene, benzene, xylene, ethylbenzene and mesitylene; and halogenated hydrocarbon solvents such as dichloromethane, 1,2-dichloroethylene, 1,1-dichloroethylene, tetrachloroethylene, chlorobenzene and dichlorobenzene. The solvents may be used singly, or two or more kinds may be used in combination. Of the solvents, the alicyclic hydrocarbon solvents and aromatic hydrocarbon solvents are preferred. The solvents may be generally used in an amount of 0 to 2,000 parts by weight based on 100 parts by weight of all the monomers.

In the processes of the invention, the addition copolymerization may be carried out in the presence of a molecular weight modifier and thereby the molecular weight of the obtainable copolymer can be controlled and flow properties in the melt-forming can be controlled. Preferred examples of the molecular weight modifiers include α-olefin compounds and substituted α-olefin compounds such as ethylene, propylene, 1-butene, 1-hexene, 1-octene, trimethylvinylsilane and trimethoxyvinylsilane; monocyclic monoolefin compounds such as cyclopentene; and aromatic vinyl compounds such as styrene and α-methylstyrene. Of the molecular weight modifiers, the α-olefin compounds and monocyclic monoolefin compounds are preferable, and ethylene is most preferable. The amount of the molecular weight modifiers may vary depending on the target molecular weight of the cyclic olefin addition copolymer, types of the catalyst components, and polymerization conditions. Preferably, the molecular weight modifiers maybe used in a molar ratio to all the monomers of 0.001 to 0.5.The molecular weight modifiers may be used singly, or two or more kinds may be used in combination.

The palladium polymerization catalyst used in the processes for producing cyclic olefin addition copolymers according to the invention has very high activity and the use thereof in a minute amount provides a conversion of 96% or more, and preferably 99% or more. As a result, the processes do not necessarily involve a step for removing the residual monomers or metal components. When the removal of the monomers or metal components is necessary, known methods may be used appropriately. For example, the polymerization solution may be subjected to extraction and separation using a solution selected from aqueous solutions, methanol solutions and ethanol solutions of oxycarboxylic acids such as lactic acid, glycolic acid, oxypropionic acid and oxybutyric acid, or triethanolamine, dialkylethanolamine or ethylenediaminetetraacetate, or may be subjected to adsorption with adsorbents such as diatomaceous earth, silica, alumina, active carbon and Celite or filtration to remove the metal components. Alternatively, the polymerization solution may be poured into alcohols such as methanol, ethanol and propanol, or ketones such as acetone and methyl ethyl ketone to precipitate the copolymer. The amount of metal components in terms of palladium atom in the cyclic olefin addition copolymers may be favorably as small as not more than 10 ppm, and more favorably not more than 5 ppm.

The polymerization solution is desolvated to afford a cyclic olefin addition copolymer. In the desolvation, additives may be added as required. The desolvation methods are not particularly limited. For example, the solution may be concentrated by heating under reduced pressure or steam may be used. Alternatively, the solution may be dried and pelletized using an extruder or the like. The polymerization solution may be directly cast to give a film.

Cyclic Olefin Addition Copolymers

The cyclic olefin addition copolymers according to the present invention are obtained by the above described processes. The copolymers include a structural unit (1) of aforementioned Formula (1) which has a C4 alkyl substituent group, a structural unit (2) of aforementioned Formula (2) which has a C5-12 alkyl substituent group, and optionally a structural unit (3) of aforementioned Formula (3). Preferably, the cyclic olefin addition copolymers consist solely of the structural unit (1), the structural unit (2) and optionally the structural unit (3).

Here, the structural units (1), (2) and (3) are generally derived from a monomer (1m) of aforementioned Formula (1m), a monomer (2m) of aforementioned Formula (2m) and a monomer (3m) of aforementioned Formula (3m), respectively.

Preferred alkyl substituent groups in the structural unit (1) include 1-butyl group. Preferred alkyl substituent groups in the structural unit (2) include substituent groups having linear or branched alkyl groups such as 1-pentyl group, 1-hexyl group, 1-heptyl group, 1-octyl group, 1-nonyl group, 1-decyl group, 1-undecyl group, 1-dodecyl group, 2-decyl group and 8-methyl-1-nonyl group, with 1-decyl group and 1-dodecyl group being preferable.

The structural unit (3) is a cyclic olefin structure unit different from the structural units (1) and (2). It may have or may not have a functional group selected from the group consisting of alkoxycarbonyl groups, alkylcarbonyloxy groups, alkenylcarbonyloxy groups, acid anhydride groups, oxetanyl groups and hydrolyzable silyl groups. When the structural unit has the above functional group, the obtainable addition copolymer has crosslinkability or gives shaped articles such as films having excellent adhesion or bonding properties. Accordingly, it is a preferred embodiment that when the cyclic olefin addition copolymer is used in applications requiring such adhesive properties, the copolymer contains the structural unit (3) having at least one functional group as described above.

When the structural unit (3) has no functional groups, the obtainable addition copolymer may achieve improved elastic modulus. Thus, in particular, the use of the structural unit (3) having no functional groups is preferable when the addition copolymer will be melt-formed. The amount of the structural unit (3) in the cyclic olefin addition copolymer is preferably not more than 20 mol % relative to all the structural units.

The structural units (1), structural units (2) or structural units (3) may be used singly, or two or more kinds may be used in combination.

The proportion of the structural unit (1) in the total of the structural units (1) and (2) is 10 to 90 mol %, preferably 20 to 90 mol %, and more preferably 40 to 90 mol %. The proportion of the structural unit (3) relative to all the structural units (the structural units (1), (2) and (3)) is 0 to 20 mol %, and preferably 10 to 20 mol %. That is, the addition copolymer desirably has a molar ratio of the structural unit (1) to the structural unit (2) (structural unit (1)/structural unit (2)) in the range of 10/90 to 90/10, preferably 20/80 to 90/20, and more preferably 40/60 to 90/10. Also preferably, the structural units (1) and (2) combined account for 80 to 100 mol % of all the structural units.

If the proportion of the structural unit (2) to the total of the structural units (1) and (2) exceeds 90 mol %, the glass transition temperature is lowered and heat resistance is poor. If the proportion is less than 10 mol %, the obtainable films or sheets have insufficient flexibility or lower formability. If the proportion of the structural unit (3) relative to all the structural units exceeds 20 mol %, the obtainable films or sheets have insufficient flexibility and are brittle.

With increasing proportion of the structural unit (2) in the cyclic olefin addition copolymer, the flexibility of shaped articles such as films and sheets from the copolymer tends to increase and the glass transition temperature tends to be lowered. Increasing the proportion of the structural unit (3) tends to increase mechanical properties and toughness of shaped articles such as films and sheets from the copolymer.

In the cyclic olefin addition copolymers of the invention, the glass transition temperature (Tg) is obtained by determining a peak temperature in temperature variance Tan $\delta = E''/E'$ wherein E' is a storage elastic modulus and E'' is a loss elastic modulus measured with a dynamic viscoelastometer. The glass transition temperature is generally 100 to 250° C., and preferably 130 to 240° C. If the glass transition temperature is below 100° C., the copolymer is not suited for applications requiring heat resistance. If the glass transition temperature exceeds 250° C., melt-forming is difficult.

The cyclic olefin addition copolymers of the invention have a number average molecular weight (Mn) relative to polystyrene standards of 20,000 to 200,000, and preferably 30,000 to 100,000 according to gel permeation chromatography (GPC). If the number average molecular weight is less than 20,000, the obtainable films or sheets may have lower mechanical strength and may be easily broken. If the number average molecular weight exceeds 200,000, the melt viscosity is so high that forming is frequently difficult or results in shaped articles having poor flatness. The molecular weight of the cyclic olefin addition copolymers may be controlled by carrying out the polymerization in the presence of an appropriate molecular weight modifier.

The cyclic olefin addition copolymers have excellent transparency. A 100 μm thick film of the copolymer generally has a spectral transmittance at 400 nm wavelength of not less than 85%, and preferably not less than 88%, and a haze of not more than 2.0%, and preferably not more than 1.0%.

<Additives>

The cyclic olefin addition copolymers may contain various additives as required. For example, antioxidants selected from phenolic antioxidants, lactone antioxidants, phosphorus antioxidants and sulfur antioxidants may be added to improve oxidation stability and thereby to prevent coloration or degradation. The antioxidants may be used in an amount of 0.001 to 5 parts by weight based on 100 parts by weight of the copolymer. Specific examples of the antioxidants include:

(1) phenolic antioxidants and hydroquinone antioxidants such as 2,6-di-t-butyl-4-methylphenol, 4,4'-thiobis(6-t-butyl-3-methylphenyl), 1,1-bis(4-hydroxyphenyl)cyclohexane, 2,2'-methylenebis(4-ethyl-6-t-butylphenol), tetrakis[methylene-3-(3,5-di-t-butyl-4-hydroxyphenyl)propionate]methane, 3-(3,5-di-t-butyl-4-hydroxyphenyl)propionic acid stearate, 2,5-di-t-butylhydroquinone and pentaerythrithyl-tetrakis[3-(3,5-di-t-butyl-4-hydroxyphenyl)]propionate;

(2) phosphorus secondary antioxidants such as bis(2,6-di-t-butyl-4-methylphenyl)pentaerythritol diphosphite, tris(2,4-di-t-butylphenyl)phosphite, tetrakis(2,4-di-t-butyl-5-methylphenyl)4,4'-biphenylene diphosphonite, 3,5-di-t-butyl-4-hydroxybenzyl phosphonate-diethyl ester, bis(2,4-di-t-butylphenyl)pentaerythritol diphosphite, tris(4-methoxy-3,5-diphenyl)phosphite and tris(nonylphenyl)phosphite; and (3) sulfur secondary antioxidants such as dilauryl-3,3'-thiodipropionate and 2-mercaptobenzimidazole.

The cyclic olefin addition copolymers may contain known flame retardants. Examples of the flame retardants include halogen flame retardants, antimony flame retardants, phosphate flame retardants and metal hydroxides. Of these, phosphate flame retardants are preferable because they are effective even in small amounts and minimize deterioration in water absorption, low dielectric constant and transparency. Condensed phosphate flame retardants are more preferred, with examples including 1,3-bis(phenylphosphoryl)benzene, 1,3-bis(diphenylphosphoryl)benzene, 1,3-bis[di(alkylphenyl)phosphoryl]benzene, 1,3-bis[di(2',6'-dimethylphenyl)phosphoryl]benzene, 1,3-bis[di(2',6'-diethylphenyl)phosphoryl]benzene, 1,3-bis[di(2',6'-diisopropylphenyl)phosphoryl]benzene, 1,3-bis[di(2',6'-dibutylphenyl)phosphoryl]benzene, 1,3-bis[di(2'-t-butylphenyl)phosphoryl]benzene, 1,3-bis[di(2'-isopropylphenyl)phosphoryl]benzene, 1,3-bis[di(2'-methylphenyl)phosphoryl]benzene, 1,4-bis(diphenylphosphoryl)benzene, 1,4-bis[di(2',6'-dimethylphenyl)phosphoryl]benzene, 1,4-bis[di(2',6'-diethylphenyl)phosphoryl]benzene, 1,4-bis[di(2',6'-diisopropylphenyl)phosphoryl]benzene, 1,4-bis[di(2'-t-butylphenyl)phosphoryl]benzene, 1,4-bis[di(2'-isopropylphenyl)phosphoryl]benzene, 1,4-bis[di(2'-methylphenyl)phosphoryl]benzene and 4,4'-bis[di(2',6'-dimethylphenyl)phosphorylphenyl]dimethylmethane. The amount of the flame retardants may vary depending on types of the flame retardants and target flame retardance. But the amount is preferably 0.5 to 40 parts by weight, more preferably 2 to 30 parts by weight, and most preferably 4 to 20 parts by weight based on 100 parts by weight of the cyclic olefin copolymer. Sufficient effects cannot be obtained if the amount is less than 0.5 part by weight. The use of the flame retardants exceeding 40 parts by weight may increase water absorption or deteriorate transparency, electric properties such as dielectric constant, or heat resistance.

The cyclic olefin addition copolymers may further contain known lubricants, UV absorbents, leveling agents or dyes as required.

<Shaped Articles>

The cyclic olefin addition copolymers have a glass transition temperature suited for melt-forming and can be shaped by methods such as injection molding, extrusion and compression molding. The copolymers may be dissolved in an appropriate solvent and be cast to form films or sheets. In particular, melt-forming is preferable because it does not entail solvents and is advantageous in costs and productivity.

The cyclic olefin addition copolymers are excellent in optical properties such as transparency, chemical resistance, heat resistance, water resistance and moisture resistance and have a glass transition temperature suited for melt-forming. Accordingly, the copolymers may be suitably used in the production of optical films by melt-forming. The obtainable optical films are excellent and balanced in optical properties such as transparency, chemical resistance, heat resistance, water resistance and moisture resistance.

Shaped articles of the cyclic olefin addition copolymers may be provided with conductive layers such as ITO, polythiophene and polyaniline, barrier layers such as silicon dioxide, silicon nitride and aluminum oxide, and known hard coat layers, antireflection layers, antifouling layers, infrared filter layers, UV filter layers and pressure-sensitive layers as required. These layers may be formed by coating, lamination, vacuum deposition, sputtering or ion plating.

Retardation Films

Retardation films of the invention may be obtained by heat stretching shaped articles such as films of the cyclic olefin addition copolymers.

The heat stretching is generally performed at temperatures in the range of Tg to (Tg−70)° C., and preferably (Tg−20)° C. to (Tg−60)° C. wherein Tg is a glass transition temperature of a melt extruded film of the cyclic olefin addition copolymer. This temperature range ensures that the film is not thermally degraded and is stretched without breakage.

Here, Tg is obtained by determining a peak temperature in temperature variance Tan δ=E"/E' wherein E' is a storage elastic modulus and E" is a loss elastic modulus measured with a viscoelastometer at a frequency of 1 Hz and a temperature increasing rate of 5° C./min in a tension mode.

The draw ratio may be determined appropriately depending on desired retardance and varies depending on whether the film is stretched uniaxially or biaxially. In the case of uniaxial stretching, the draw ratio is generally 1.01 to 5 times, preferably 1.1 to 3 times, and particularly preferably 1.3 to 2.7 times.

In the retardation films, the retardance (Re) at 550 nm wavelength, thickness (nm), and draw ratio in the heat stretching of an unstretched film preferably satisfy the following equation:

$$[(Re\ (nm)/thickness\ (nm))/draw\ ratio] > 0.001$$

Herein, the retardance expression properties are defined to be α in the following equation:

$$\alpha = 1000 \times (Re/thickness)/draw\ ratio$$

The thickness of the retardation films of the invention is 0.1 to 150 μm, and preferably 10 to 150 μm.

The retardation films preferably have a haze of not more than 2.0%, and more preferably not more than 1.0%.

The retardation films have a yellowness index (YI) of not more than 2.0, and preferably not more than 1.0.

The shaped articles of the cyclic olefin addition copolymers may be provided with conductive layers such as ITO, polythiophene and polyaniline, barrier layers such as silicon dioxide, silicon nitride and aluminum oxide, and known hard coat layers, antireflection layers, antifouling layers, infrared filter layers, UV filter layers and pressure-sensitive layers as required. These layers may be formed by coating, lamination, vacuum deposition, sputtering or ion plating.

<Uses>

The cyclic olefin addition copolymers have excellent transparency and heat resistance and low water absorption and dielectric constant and are suitably used in fields such as optical materials, medical tools and electric and electronic parts.

The optical materials include liquid crystal display elements, organic EL elements, plasma displays, electronic papers, color filter substrates for display, nanoimprinted substrates, transparent conductive films or membranes laminated with ITO or conductive resin layers, touch panels, light guide plates, protective films, polarizing films, retardation films, near infrared cut films, light diffusion films, antireflection films, high reflection films, semi-transparent semi-reflection films, ND filters, dichroic filters, electromagnetic wave shielding films, beam splitters, optical communication filters, optical lenses and prisms such as camera lenses, pick up lenses and F-θ lenses, and optical recording substrates such as MD, CD and DVD. The medical tools include chemical packaging materials, sterilizing containers, syringes, pipes, tubes and ampules. The electric and electronic parts include containers, trays, carrier tapes, separation films, insulating films and printed board materials.

The retardation films of the invention have excellent transparency and heat resistance and low water absorption and dielectric constant and are suitably used as optical materials such as liquid crystal display elements, organic EL elements, plasma displays, electronic papers and polarizing films.

EXAMPLES

The present invention will be described based on examples below without limiting the scope of the invention. The molecular weight and glass transition temperature of the cyclic olefin addition copolymers, and film properties such as transparency and strength were determined by the following methods.

(1) Molecular Weight

The molecular weight was determined relative to polystyrene standards with gel permeation chromatograph Shodex GPC-101 manufactured by Showa Denko K.K. using tetrahydrofuran (THF) as a solvent.

(2) Glass Transition Temperature

The glass transition temperature was determined based on temperature variance Tan δ=E"/E' wherein E' was a storage elastic modulus and E" was a loss elastic modulus measured with a viscoelastometer from TA Instruments. Japan., at a frequency of 1 Hz and a temperature increasing rate of 5° C./min in a tension mode.

(3) Composition of Copolymer

Part of the polymerization solution was collected and the polymer was precipitated with excess isopropanol. The supernatant liquid was analyzed on gas chromatograph (GC-14B manufactured by Shimadzu Corporation) with a capillary column (thickness: 1 μm, inner diameter: 0.25 m, length: 60 m), and the residual monomers were quantitatively determined and the composition of the polymer was calculated.

(4) Spectral Transmittance and Haze

A film 100 μm in thickness was analyzed to determine the spectral transmittance at 400 nm wavelength using a visible ultraviolet spectrophotometer (U-2010 Spectro Photo Meter manufactured by Hitachi, Ltd.).

The haze was determined in accordance with JIS K 7105 using Haze-Gard Plus (manufactured by BYK-Gardner).

(5) Break Strength, Elongation and Breaking Energy

These properties were determined by stretching a specimen at a stress rate of 3 mm/min in accordance with JIS K 7113.

(6) Water Absorption Percentage

The water absorption percentage was determined from weight change before and after a film was soaked in water at 23° C. for 24 hours.

(7) Yellowness Index (YI)

A film 100 μm in thickness was analyzed with TCS II spectrophotometric calorimeter (manufactured by BYK-Gardner) in accordance with ASTM D 1925.

(8) Retardance of Transmitted Light

The retardance was determined with RETS-1200 VA (manufactured by OTSUKA ELECTRONICS CO., LTD.).

(9) Residual Solvent Amount (Residual Solvent Concentration)

The organic solvent in a film was extracted with methylene chloride and was isolated with gas chromatograph (GC) (GC-2100 manufactured by Shimadzu Corporation) with a capillary column (TC-1 manufactured by GL Sciences Inc.). The amount of the residual solvent was determined by calibration.

Example 1

A 1-liter stainless steel reactor was charged with 600 g of toluene, 60 g (0.40 mol) of 5-butylbicyclo[2.2.1]hepta-2-ene and 140 g (0.60 mol) of 5-decylbicyclo[2.2.1]hepta-2-ene in a nitrogen atmosphere. Ethylene was fed to 0.010 MPa while stirring the materials. The inside temperature was increased to 30° C. and polymerization was initiated by adding a toluene solution containing $3.99 \times 10^{-3}$ mmol of (tricyclopentylphosphine)palladium di(acetate) and a toluene solution containing $3.99 \times 10^{-3}$ mmol of triphenylcarbenium tetrakis(pentafluorophenyl)borate. Polymerization was carried out for 12 hours in total, and the quantitative determination of unreacted monomers provided a conversion of 99% and a 5-decylbicyclo[2.2.1]hepta-2-ene content in the copolymer of 59 mol %. The reaction solution was diluted with toluene and was poured into 2 L of isopropyl alcohol to precipitate the product. Heating under vacuum to dryness resulted in 198 g of a copolymer A. The copolymer A had Mn of 87,000 and Mw of 287,000.

100 Parts by weight of the copolymer A was mixed with 0.5 part by weight each of pentaerythrithyltetrakis[3-(3,5-di-t-butyl-4-hydroxyphenyl)propionate] and tris(2,4-di-t-butylphenyl)phosphite. The mixture was formed into a 100 μm thick film A with a vacuum press machine at 240° C. The film A had a glass transition temperature of 162° C. As shown in Table 1, the copolymer had excellent heat resistance, transparency and low-water absorption, high elongation properties and in particular very high breaking energy that is an index of film strength, and good melt-forming properties.

Example 2

Polymerization was carried out in the same manner as in Example 1, except that the 5-butylbicyclo[2.2.1]hepta-2-ene was added at 114 g (0.76mol), the 5-decylbicyclo[2.2.1]hepta-2-ene at 86 g (0.37 mol), (tricyclopentylphosphine)palladium di(acetate) in the toluene solution at $4.51 \times 10^{-3}$ mmol and triphenylcarbenium tetrakis(pentafluorophenyl)borate in the toluene solution at $4.51 \times 10^{-3}$ mmol.

The quantitative determination of unreacted monomers provided a conversion of 99% and a 5-decylbicyclo[2.2.1]hepta-2-ene content in the copolymer of 32 mol %. The reaction solution was diluted with toluene and was poured into 2 L of isopropyl alcohol to precipitate the product. Heating under vacuum to dryness resulted in 198 g of a copolymer B. The copolymer B had Mn of 46,000 and Mw of 276,000.

100 Parts by weight of the copolymer B was mixed with 0.5 part by weight each of pentaerythrithyltetrakis[3-(3,5-di-t-butyl-4-hydroxyphenyl)propionate] and tris(2,4-di-t-butylphenyl)phosphite. The mixture was formed into a 100 μm thick film B with a vacuum press machine at 250° C. The film B had a glass transition temperature of 205° C. As shown in Table 1, the copolymer had excellent heat resistance, transparency and low-water absorption, high elongation properties and in particular very high breaking energy that is an index of film strength, and good melt-forming properties.

Example 3

Polymerization was carried out in the same manner as in Example 1, except that the 5-butylbicyclo[2.2.1]hepta-2-ene was added at 144 g (0.96 mol), the 5-decylbicyclo[2.2.1]hepta-2-ene at 56 g (0.24 mol), (tricyclopentylphosphine)palladium di(acetate) in the toluene solution at $4.79 \times 10^{-3}$ mmol and triphenylcarbenium tetrakis(pentafluorophenyl)borate in the toluene solution at $4.79 \times 10^{-3}$ mmol.

The quantitative determination of unreacted monomers provided a conversion of 99% and a 5-decylbicyclo[2.2.1]hepta-2-ene content in the copolymer of 19 mol %. The reaction solution was diluted with toluene and was poured into 2 L of isopropyl alcohol to precipitate the product. Heating under vacuum to dryness resulted in 198 g of a copolymer C. The copolymer C had Mn of 46,000 and Mw of 225,000.

100 Parts by weight of the copolymer C was mixed with 0.5 part by weight each of pentaerythrithyltetrakis[3-(3,5-di-t-butyl-4-hydroxyphenyl)propionate] and tris(2,4-di-t-butylphenyl)phosphite. The mixture was formed into a 100 μm thick film C with a vacuum press machine at 270° C. The film C had a glass transition temperature of 235° C. As shown in Table 1, the copolymer had excellent heat resistance, transparency and low-water absorption, high elongation properties and in particular very high breaking energy that is an index of film strength, and good melt-forming properties.

Example 4

A 1-liter stainless steel reactor was charged with 600 g of toluene, 92 g (0.61mol) of 5-butylbicyclo[2.2.1]hepta-2-ene, 84 g (0.36 mol) of 5-decylbicyclo[2.2.1]hepta-2-ene and 25.8 g (0.21 mol) of a 75 wt % toluene solution of bicyclo[2.2.1]hepta-2-ene in a nitrogen atmosphere. Ethylene was fed to 0.013 MPa while stirring the materials. The inside temperature was increased to 40° C. and polymerization was initiated by adding a toluene solution containing $4.92 \times 10^{-3}$ mmol of (tricyclopentylphosphine)palladium di(acetate) and a toluene solution containing $4.92 \times 10^{-3}$ mmol of triphenylcarbenium tetrakis(pentafluorophenyl)borate. Polymerization was carried out for 10 hours in total, and the quantitative determination of unreacted monomers provided a conversion of 99%, a 5-butylbicyclo[2.2.1]hepta-2-ene content of 52 mol %, a 5-decylbicyclo[2.2.1]hepta-2-ene content of 30 mol %, and a bicyclo[2.2.1]hepta-2-ene content of 18 mol % in the copolymer. The reaction solution was diluted with toluene and was poured into 2 L of isopropyl alcohol to precipitate the product. Heating under vacuum to dryness resulted in 193 g of a copolymer D. The copolymer D had Mn of 57,000 and Mw of 264,000.

100 Parts by weight of the copolymer D was mixed with 0.5 part by weight each of pentaerythrithyltetrakis[3-(3,5-di-t-butyl-4-hydroxyphenyl)propionate] and tris(2,4-di-t-butylphenyl)phosphite. The mixture was formed into a 100 μm thick film D with a vacuum press machine at 240° C. The film D had a glass transition temperature of 192° C. As shown in Table 1, the copolymer had excellent heat resistance, transparency and low-water absorption, high elongation properties and in particular very high breaking energy that is an index of film strength, and good melt-forming properties.

Comparative Example 1

A 1-liter stainless steel reactor was charged with 600 g of toluene, 99 g (0.66 mol) of 5-butylbicyclo[2.2.1]hepta-2-ene and 143.7 g (1.07 mol) of a 75 wt % toluene solution of bicyclo[2.2.1]hepta-2-ene in a nitrogen atmosphere. Ethylene was fed to 0.015 MPa while stirring the materials. The inside temperature was increased to 50° C. and polymerization was initiated by adding a toluene solution containing $3.85 \times 10^{-3}$ mmol of (tricyclopentylphosphine)palladium di(acetate) and a toluene solution containing $3.85 \times 10^{-3}$ mmol of triphenylcarbenium tetrakis(pentafluorophenyl)borate. Polymerization was carried out for 10 hours in total, and the quantitative determination of unreacted monomers provided a conversion of 99% and a 5-butylbicyclo[2.2.1]hepta-2-ene content in the copolymer of 38 mol %. The reaction solution was diluted with toluene and was poured into 2 L of isopropyl alcohol to precipitate the product. Heating under vacuum to dryness resulted in 198 g of a copolymer E. The copolymer E had Mn of 46,000 and Mw of 204,000.

100 Parts by weight of the copolymer E was mixed with 0.5 part by weight each of pentaerythrithyltetrakis[3-(3,5-di-t-butyl-4-hydroxyphenyl)propionate] and tris(2,4-di-t-butylphenyl)phosphite. Toluene was added to the mixture to give a solution having a solid concentration of 20 wt %. The solution was cast on a PET film and was dried at 100° C. for 1 hour, at 150° C. for 1 hour and at 180° C. for 2 hours, thereby forming a 100 μm thick film E. The film E had a glass transition temperature of 272° C. As shown in Table 1, the copolymer had excellent heat resistance, transparency, low-water absorption and break strength. However, the film was brittle because of insufficient elongation properties and in particular low breaking energy that is an index of film strength (toughness). Further, melt-forming properties of the copolymer were bad.

Comparative Example 2

A 1-liter stainless steel reactor was charged with 600 g of toluene, 91 g (0.39mol) of 5-decylbicyclo[2.2.1]hepta-2-ene and 145.3 g (1.16 mol) of a 75 wt % toluene solution of bicyclo[2.2.1]hepta-2-ene in a nitrogen atmosphere. Ethylene was fed to 0.020 MPa while stirring the materials. The inside temperature was increased to 50° C. and polymerization was initiated by adding a toluene solution containing $3.44 \times 10^{-3}$ mmol of (tricyclopentylphosphine)palladium di(acetate) and a toluene solution containing $3.44 \times 10^{-3}$ mmol of triphenylcarbenium tetrakis(pentafluorophenyl)borate. Polymerization was carried out for 10 hours in total, and the quantitative determination of unreacted monomers provided a conversion of 99% and a 5-decylbicyclo[2.2.1]hepta-2-ene content in the copolymer of 25 mol %. The reaction solution was diluted with toluene and was poured into 2 L of isopropyl alcohol to precipitate the product. Heating under vacuum to dryness resulted in 198 g of a copolymer F. The copolymer F had Mn of 62,000 and Mw of 239,000.

100 Parts by weight of the copolymer F was mixed with 0.5 part by weight each of pentaerythrithyltetrakis[3-(3,5-di-t-butyl-4-hydroxyphenyl)propionate] and tris(2,4-di-t-butylphenyl)phosphite. The mixture was formed into a 100 μm thick film F with a vacuum press machine at 260° C. The film F had a glass transition temperature of 189° C. As shown in Table 1, the copolymer had excellent heat resistance, transparency, low-water absorption and melt-forming properties. However, the film was brittle and poor in toughness because of insufficient elongation properties and breaking energy.

TABLE 1

|  | Ex. 1 | Ex. 2 | Ex. 3 | Ex. 4 | Comp. Ex. 1 | Comp. Ex. 2 |
|---|---|---|---|---|---|---|
| Film | A | B | C | D | E | F |
| Glass transition temperature (° C.) | 162 | 205 | 235 | 192 | 272 | 189 |
| Spectral transmittance (%) (400 nm) | 91 | 91 | 91 | 91 | 91 | 91 |
| Haze (%) | 0.4 | 0.3 | 0.3 | 0.4 | 0.5 | 0.4 |
| Break strength (MPa) | 18 | 25 | 32 | 30 | 52 | 38 |
| Break elongation (%) | 140 | 70 | 45 | 54 | 5 | 11 |
| Breaking energy ($10^5$ J/m$^3$) | 155 | 120 | 104 | 108 | 15 | 38 |
| Water absorption (wt %) | ≦0.1 | ≦0.1 | ≦0.1 | ≦0.1 | ≦0.1 | ≦0.1 |
| Melt-formability | Good | Good | Good | Good | Bad | Good |

Example 5

<Synthesis of Copolymer G>

A 1-liter stainless steel reactor was charged with 520 g of dehydrated toluene, 83 g (0.55 mol) of 5-butylbicyclo[2.2.1]hepta-2-ene and 70 g (0.30 mol) of 5-decylbicyclo[2.2.1]hepta-2-ene in a nitrogen atmosphere. Ethylene was fed to 0.025 MPa while stirring the materials. The inside temperature was increased to 30° C. and polymerization was initiated by adding $3.40 \times 10^{-3}$ mmol of (tricyclopentylphosphine)palladium di(acetate) in a toluene solution and $3.40 \times 10^{-3}$ mmol of triphenylcarbenium tetrakis(pentafluorophenyl)borate in a toluene solution. Polymerization was carried out for 12 hours in total, and the quantitative determination of unreacted monomers provided a conversion of 99% and a 5-decylbicyclo[2.2.1]hepta-2-ene content in the copolymer of 34 mol %. The reaction solution was diluted with toluene and was poured into 4 L of isopropyl alcohol to precipitate the product. Heating under vacuum to dryness resulted in 151 g of a copolymer G. The copolymer G had Mn of 82,000 and Mw of 283,000. The glass transition temperature was 205° C.

<Production of Film G>

100 Parts by weight of the copolymer G, 0.5 part by weight of antioxidant pentaerythrithyltetrakis[3-(3,5-di-t-butyl-4-hydroxyphenyl)]propionate and 0.5 part by weight of antioxidant tris(2,4-di-t-butylphenyl)phosphite were dissolved in 350 parts by weight of toluene. The solution was cast at 25° C. and the solvent was gradually evaporated until the residual solvent concentration became 15 wt %. The film was separated from the support and was held in vacuum at 100° C. for 180 minutes, thereby producing a film G having a thickness of 110 μm and a residual solvent concentration of 0.1 wt %.

<Production of Retardation Film>

The film G was heated in a tenter at 179° C. (copolymer G's Tg minus 26° C.) and was stretched 1.52 times at a stretching rate of 120%/min. The film was then cooled to room temperature, and a retardation film G-1 was thus obtained. The heat-stretched retardation film G-1 was measured for spectral transmittance, haze, retardance at 550 nm wavelength and thickness. The results are shown in Table 2. The results were good, with a spectral transmittance of 91%, haze of 0.3%, YI of 0.4, and retardance at 550 nm of 314 nm. The thickness was 96 μm.

Example 6

A retardation film G-2 was prepared and tested in the same manner as in Example 5, except that the film G was heated in a tenter at 159° C. (copolymer G's Tg minus 46° C.) and was stretched 1.59 times at a stretching rate of 120%/min and cooled to room temperature. The results are shown in Table 2. The results were good, with a spectral transmittance of 91%, haze of 0.4%, YI of 0.4, and retardance at 550 nm of 386 nm. The thickness was 88 μm.

Example 7

<Production of Film H>

100 Parts by weight of the copolymer G obtained in Example 5, 0.5 part by weight of antioxidant pentaerythrithyltetrakis[3-(3,5-di-t-butyl-4-hydroxyphenyl)]propionate and 0.5 part by weight of antioxidant tris(2,4-di-t-butylphenyl)phosphite were dissolved in 350 parts by weight of toluene. The solution was cast at 25° C. and the solvent was gradually evaporated until the residual solvent concentration became 13 wt %. The film was separated from the support and was held in vacuum at 100° C. for 120 minutes, thereby producing a film H having a thickness of 144 μm and a residual solvent concentration of 0.1 wt %.

<Production of Retardation Film>

A retardation film H-1 was prepared and tested in the same manner as in Example 5, except that the film H was heated in a tenter at 149° C. (copolymer G's Tg minus 56° C.) and was stretched 2.43 times at a stretching rate of 120%/min and cooled to room temperature. The results are shown in Table 2. The results were good, with a spectral transmittance of 91%, haze of 0.4%, YI of 0.4, and retardance at 550 nm of 697 nm. The thickness was 101 μm.

Example 8

<Production of Film I>

100 Parts by weight of the copolymer G obtained in Example 5, 0.5 part by weight of antioxidant pentaerythrithyltetrakis[3-(3,5-di-t-butyl-4-hydroxyphenyl)]propionate and 0.5 part by weight of antioxidant tris(2,4-di-t-butylphenyl)phosphite were mixed together and the mixture was extruded with a single screw extruder at a resin temperature of 275° C. to give a film I having a thickness of 109 μm.

<Production of Retardation Film>

A retardation film I-1 was prepared and tested in the same manner as in Example 5, except that the film I was heated in a tenter at 159° C. (copolymer G's Tg minus 46° C.) and was stretched 1.50 times at a stretching rate of 120%/min and cooled to room temperature. The results are shown in Table 2. The results were good, with a spectral transmittance of 91%, haze of 0.5%, YI of 0.5, and retardance at 550 nm of 344 nm. The thickness was 92 μm.

Example 9

<Synthesis of Copolymer H>

A 1-liter stainless steel reactor was charged with 450 g of dehydrated toluene, 21.3 ml of a dry toluene solution of bicyclo[2.2.1]hepta-2-ene (0.15 mol), 69 g (0.46 mol) of 5-butylbicyclo[2.2.1]hepta-2-ene and 65 g (0.28 mol) of 5-decylbicyclo[2.2.1]hepta-2-ene in a nitrogen atmosphere. Ethylene was fed to 0.037 MPa while stirring the materials. The inside temperature was increased to 50° C. and polymerization was initiated by adding $3.08 \times 10^{-3}$ mmol of (tricyclopentylphosphine)palladium di(acetate) in a toluene solution and $3.08 \times 10^{-3}$ mmol of triphenylcarbenium tetrakis(pentafluorophenyl)borate in a toluene solution. After 90 minutes and 210 minutes after polymerization was initiated, 4.00 ml and 1.33 ml of the toluene solution of bicyclo[2.2.1]hepta-2-ene was added, respectively. Polymerization was carried out for 6 hours in total, and the quantitative determination of unreacted monomers provided a conversion of 99%, a 5-butylbicyclo[2.2.1]hepta-2-ene content of 50 mol % and a 5-decylbicyclo[2.2.1]hepta-2-ene content of 29 mol % in the copolymer. The reaction solution was diluted with toluene and was poured into 4 L of isopropyl alcohol to precipitate the product. Heating under vacuum to dryness resulted in 151 g of a copolymer H. The copolymer H had Mn of 55,000 and Mw of 208,000. The glass transition temperature was 193° C.

<Production of Film J>

100 Parts by weight of the copolymer H, 0.5 part by weight of antioxidant pentaerythrithyltetrakis[3-(3,5-di-t-butyl-4-hydroxyphenyl)]propionate and 0.5 part by weight of antioxidant tris(2,4-di-t-butylphenyl)phosphite were dissolved in 350 parts by weight of toluene. The solution was cast at 25° C. and the solvent was gradually evaporated until the residual solvent concentration became 15 wt %. The film was separated from the support and was held in vacuum at 100° C. for 180 minutes, thereby producing a film J having a thickness of 77 μm and a residual solvent concentration of 0.1 wt %.
<Production of Retardation Film>

A retardation film J-1 was prepared and tested in the same manner as in Example 5, except that the film J was heated in a tenter at 158° C. (copolymer H's Tg minus 35° C.) and was stretched 1.56 times at a stretching rate of 120%/min and cooled to room temperature. The results are shown in Table 2. The results were good, with a spectral transmittance of 91%, haze of 0.7%, YI of 0.4, and retardance at 550 nm of 326 nm. The thickness was 63 μm.

Comparative Example 3

<Synthesis of Copolymer I>

A 1-liter stainless steel reactor was charged with 600 g of dehydrated toluene, 72.1 ml of a dry toluene solution of bicyclo[2.2.1]hepta-2-ene (0.50 mol) and 50 g (0.33 mol) of 5-butylbicyclo[2.2.1]hepta-2-ene in a nitrogen atmosphere. Ethylene was fed to 0.069 MPa while stirring the materials. The inside temperature was increased to 50° C. and polymerization was initiated by adding $1.66 \times 10^{-3}$ mmol of (tricyclopentylphosphine)palladium di(acetate) in a toluene solution and $1.66 \times 10^{-3}$ mmol of triphenylcarbenium tetrakis(pentafluorophenyl)borate in a toluene solution. Polymerization was carried out for 7 hours in total, and the quantitative determination of unreacted monomers provided a conversion of 99% and a 5-butylbicyclo[2.2.1]hepta-2-ene content in the copolymer of 39 mol %. The reaction solution was diluted with toluene and was poured into 4 L of isopropyl alcohol to precipitate the product. Heating under vacuum to dryness resulted in 96 g of a copolymer I. The copolymer I had Mn of 45,000 and Mw of 192,000. The glass transition temperature was 268° C.
<Production of Film K>

100 Parts by weight of the copolymer I, 0.5 part by weight of antioxidant pentaerythrithyltetrakis[3-(3,5-di-t-butyl-4-hydroxyphenyl)]propionate and 0.5 part by weight of antioxidant tris(2,4-di-t-butylphenyl)phosphite were dissolved in 350 parts by weight of toluene. The solution was cast at 25° C. and the solvent was gradually evaporated until the residual solvent concentration became 15 wt %. The film was separated from the support and was held in a nitrogen atmosphere at 180° C. for 90 minutes, thereby producing a film K having a thickness of 86 μm and a residual solvent concentration of 0.1 wt %.
<Production of Retardation Film>

The film K was heated in a tenter at 235° C. (copolymer I's Tg minus 33° C.) and was stretched 1.63 times at a stretching rate of 120%/min and cooled to room temperature. The retardation film K-1 obtained was colored because of oxidation degradation and had a spectral transmittance of 75%, haze of 0.4% and YI of 6.0. Evaluation of properties as retardation films failed.

TABLE 2

|  | Ex. 5 | Ex. 6 | Ex. 7 | Ex. 8 | Ex. 9 | Comp. Ex. 3 |
|---|---|---|---|---|---|---|
| Film No. | G-1 | G-2 | H-1 | I-1 | J-1 | K-1 |
| Spectral transmittance (%) (400 nm) | 91 | 91 | 91 | 91 | 91 | 75 |
| Haze (%) | 0.3 | 0.4 | 0.4 | 0.5 | 0.7 | 0.4 |
| YI | 0.4 | 0.4 | 0.4 | 0.5 | 0.4 | 6.0 |
| Retardance (nm) | 314 | 386 | 697 | 344 | 326 | — |

TABLE 2-continued

|  | Ex. 5 | Ex. 6 | Ex. 7 | Ex. 8 | Ex. 9 | Comp. Ex. 3 |
|---|---|---|---|---|---|---|
| Thickness (μm) | 96 | 88 | 101 | 92 | 63 | 68 |
| Retardance expression properties (α) | 2.15 | 2.76 | 2.84 | 2.49 | 3.32 | — |

INDUSTRIAL APPLICABILITY

The cyclic olefin addition copolymers are suitably used in fields such as optical materials, electric and electronic parts, and medical tools.

The optical materials include liquid crystal display elements, organic EL elements, plasma displays, electronic papers, color filter substrates for display, nanoimprinted substrates, transparent conductive films or membranes laminated with ITO or conductive resin layers, touch panels, light guide plates, protective films, polarizing films, retardation films, near infrared cut films, light diffusion films, antireflection films, high reflection films, semi-transparent semi-reflection films, ND filters, dichroic filters, electromagnetic wave shielding films, beam splitters, optical communication filters, optical lenses and prisms such as camera lenses, pick up lenses and F-θ lenses, and optical recording substrates such as MD, CD and DVD. The electric and electronic parts include containers, trays, carrier tapes, separation films, insulating materials for OA equipment and insulating layer materials for flexible printed boards. The medical tools include chemical packaging materials, sterilizing containers, syringes, pipes, tubes and ampules.

The retardation films of the invention have excellent transparency and heat resistance and low water absorption and dielectric constant and are suitably used as optical materials such as liquid crystal display elements, organic EL elements, plasma displays, electronic papers and polarizing films.

The invention claimed is:

1. An optical film comprising a cyclic olefin addition copolymer comprising a structural unit (1) represented by Formula (1) below and a structural unit (2) represented by Formula (2) below:

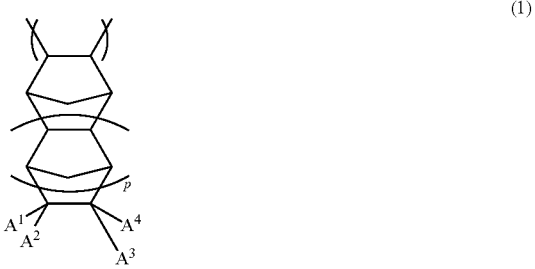

(1)

wherein one of $A^1$, $A^2$, $A^3$ or $A^4$ is a $C_4$ alkyl group and the other groups are each independently a hydrogen atom, a halogen atom or a methyl group, and p is an integer of 0 to 5;

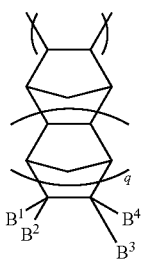

(2)

wherein one of $B^1$, $B^2$, $B^3$ or $B^4$ is a $C_{5-12}$ alkyl group and the other groups are each independently a hydrogen atom, a halogen atom or a methyl group, and q is an integer of 0 to 5.

2. The optical film according to claim 1, wherein the molar ratio of structural unit (1) to structural unit (2) ranges from 10/90 to 90/10, and structural units (1) and (2) combined account for 80 to 100 mol % of all the structural units.

3. The optical film according to claim 1, wherein the cyclic olefin addition copolymer further comprises a structural unit (3) represented by Formula (3) below at not more than 20 mol % relative to all the structural units of the addition copolymer:

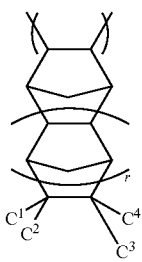

(3)

wherein $C^1$, $C^2$, $C^3$ and $C^4$ are each independently an atom or a moiety selected from the group consisting of alkoxycarbonyl groups, alkylcarbonyloxy groups, alkenylcarbonyloxy groups, acid anhydride groups, oxetanyl groups, hydrolyzable silyl groups, a hydrogen atom, a methyl group and halogen atoms; and r is an integer of 0 to 5.

4. The optical film according to claim 1, wherein the cyclic olefin addition copolymer has a glass transition temperature of 100 to 250° C. and a number average molecular weight of 20,000 to 200,000.

5. An optical film obtained by melt extruding a cyclic olefin addition copolymer comprising a structural unit (1) represented by Formula (1) below and a structural unit (2) represented by Formula (2) below:

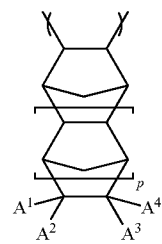

(1)

wherein one of $A^1$, $A^2$, $A^3$ or $A^4$ is a $C_4$ alkyl group and the other groups are each independently a hydrogen atom, a halogen atom or a methyl group, and p is an integer of 0 to 5;

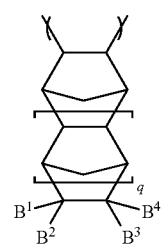

(2)

wherein one of $B^1$, $B^2$, $B^3$ or $B^4$ is a $C_{5-12}$ alkyl group and the other groups are each independently a hydrogen atom, a halogen atom or a methyl group, and q is an integer of 0 to 5.

6. A retardation film obtained by stretching a film comprising a cyclic olefin addition copolymer comprising a structural unit (1) represented by Formula (1) below and a structural unit (2) represented by Formula (2) below:

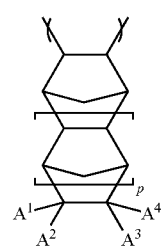

(1)

wherein one of $A^1$, $A^2$, $A^3$ or $A^4$ is a $C_4$ alkyl group and the other groups are each independently a hydrogen atom, a halogen atom or a methyl group, and p is an integer of 0 to 5;

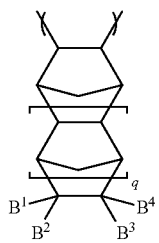

(2)

wherein one of $B^1$, $B^2$, $B^3$ or $B^4$ is a $C_{5-12}$ alkyl group and the other groups are each independently a hydrogen atom, a halogen atom or a methyl group, and q is an integer of 0 to 5.

7. The retardation film according to claim 6, wherein the molar ratio of structural unit (1) to structural unit (2) ranges from 10/90 to 90/10, and structural units (1) and (2) combined account for 80 to 100 mol % of all the structural units.

8. The retardation film according to claim 6, wherein said copolymer further comprises a structural unit (3) represented by Formula (3) below, said structural unit (3) being present at not more than 20 mol % relative to all the structural units of the addition copolymer:

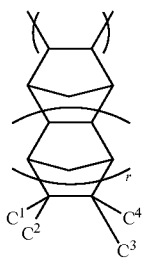

(3)

wherein $C^1$, $C^2$, $C^3$ and $C^4$ are each independently an atom or a moiety selected from the group consisting of alkoxycarbonyl groups, alkylcarbonyloxy groups, alkenylcarbonyloxy groups, acid anhydride groups, oxetanyl groups, hydrolyzable silyl groups, a hydrogen atom, a methyl group and halogen atoms; and r is an integer of 0 to 5.

9. The retardation film according to claim 6, wherein the stretching temperature is in the range of Tg to (Tg–70)° C. wherein Tg is glass transition temperature of the cyclic olefin addition copolymer, and the draw ratio is 1.1 to 3.0 times.

10. The retardation film according to claim 6, wherein the retardance (Re), thickness, and draw ratio satisfy the following equation:

[(Re (nm)/thickness (nm))/draw ratio]>0.001.

11. The retardation film according to claim 6, wherein the film obtained by stretching the cyclic olefin addition copolymer has a thickness of 0.1 to 150 μm.

12. The retardation film according to claim 6, wherein the cyclic olefin addition copolymer has a glass transition temperature (Tg) of 120 to 250° C. and a number average molecular weight of 20,000 to 200,000.

13. The optical film according to claim 5, wherein the molar ratio of structural unit (1) to structural unit (2) ranges from 10/90 to 90/10, and structural units (1) and (2) combined account for 80 to 100 mol % of all the structural units.

14. The optical film according to claim 5, wherein the cyclic olefin addition copolymer further comprises a structural unit (3) represented by Formula (3) below at not more than 20 mol % relative to all the structural units of the addition copolymer:

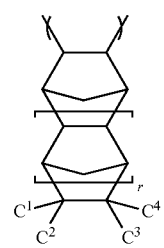

(3)

wherein $C^1$, $C^2$, $C^3$ and $C^4$ are each independently an atom or a moiety selected from the group consisting of alkoxycarbonyl groups, alkylcarbonyloxy groups, alkenylcarbonyloxy groups, acid anhydride groups, oxetanyl groups, hydrolyzable silyl groups, a hydrogen atom, a methyl group and halogen atoms; and r is an integer of 0 to 5.

15. The optical film according to claim 5, wherein the cyclic olefin addition copolymer has a glass transition temperature of 100 to 250° C. and a number average molecular weight of 20,000 to 200,000.

16. A process for producing a cyclic olefin addition copolymer, which process comprises addition copolymerizing a monomer composition in the presence of a catalyst obtained from (a), (b) and (d) described below or a catalyst obtained from (c) and (d) described below, the monomer composition comprising a monomer (1m) represented by Formula (1m) below, a monomer (2m) represented by Formula (2m) below and optionally a monomer (3m) represented by Formula (3m) below, the molar ratio of monomer (ml) to monomer (2m) being in the range of 10/90 to 90/10, the monomers (1m) and (2m) combined accounting for not less than 80 mol % of all the structural units:

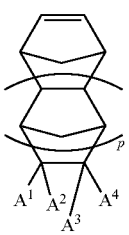

(1m)

wherein one of $A^1$, $A^2$, $A^3$ or $A^4$ is a $C_4$ alkyl group and the other groups are each independently a hydrogen atom, a halogen atom or a methyl group, and p is an integer of 0 to 5;

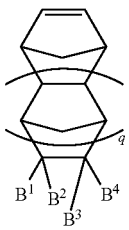

(2m)

wherein one of $B^1$, $B^2$, $B^3$ or $B^4$ is a $C_{5-12}$ alkyl group and the other groups are each independently a hydrogen atom, a halogen atom or a methyl group, and q is an integer of 0 to 5;

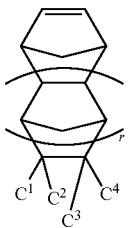

(3m)

wherein $C^1$, $C^2$, $C^3$ and $C^4$ are each independently an atom or a moiety selected from the group consisting of alkoxycarbonyl groups, alkylcarbonyloxy groups, alkenylcarbonyloxy groups, acid anhydride groups, oxetanyl groups, hydrolyzable silyl groups, a hydrogen atom, a methyl group and halogen atoms; and r is an integer of 0 to 5;

(a) a palladium organic acid salt or a palladium β-diketonate compound;

(b) a phosphine compound represented by Formula (b) below:

$$P(R^1)_2(R^2) \quad \text{(b)}$$

wherein $R^1$ is a substituent selected from the group consisting of a cyclopentyl group, a cyclohexyl group and an isopropyl group, and $R^2$ is a $C_{3-10}$ hydrocarbon group;

(c) a divalent palladium phosphine complex represented by Formula (c) below:

$$Pd[P(R^1)_2(R^2)]X_2 \quad \text{(c)}$$

wherein $R^1$ is a substituent group selected from the group consisting of a cyclopentyl group, a cyclohexyl group and an isopropyl group, $R^2$ is a $C_{3-10}$ hydrocarbon group, X is an organic acid anion or a β-diketonate anion, and n is 1 or 2;

(d) an ionic boron compound.

17. The process for producing a cyclic olefin addition copolymer according to claim 16, wherein said process comprises addition copolymerizing the monomer composition in the presence of a catalyst obtained from (a), (b) and (d).

18. The process for producing a cyclic olefin addition copolymer according to claim 16, wherein said process comprises addition copolymerizing the monomer composition in the presence of a catalyst obtained from (c) and (d).

19. The process for producing a cyclic olefin addition copolymer according to claim 16, wherein the monomer composition comprises monomer (1m) represented by Formula (1m), monomer (2m) represented by Formula (2m) and a monomer (3m) represented by Formula (3m).

20. The process for producing a cyclic olefin addition copolymer according to claim 17, wherein the monomer composition comprises monomer (1m) represented by Formula (1m), monomer (2m) represented by Formula (2m) and a monomer (3m) represented by Formula (3m).

* * * * *